(No Model.)
G. RICHARDSON.
APPARATUS FOR HARDENING ARTIFICIAL STONE.
No. 413,263. Patented Oct. 22, 1889.
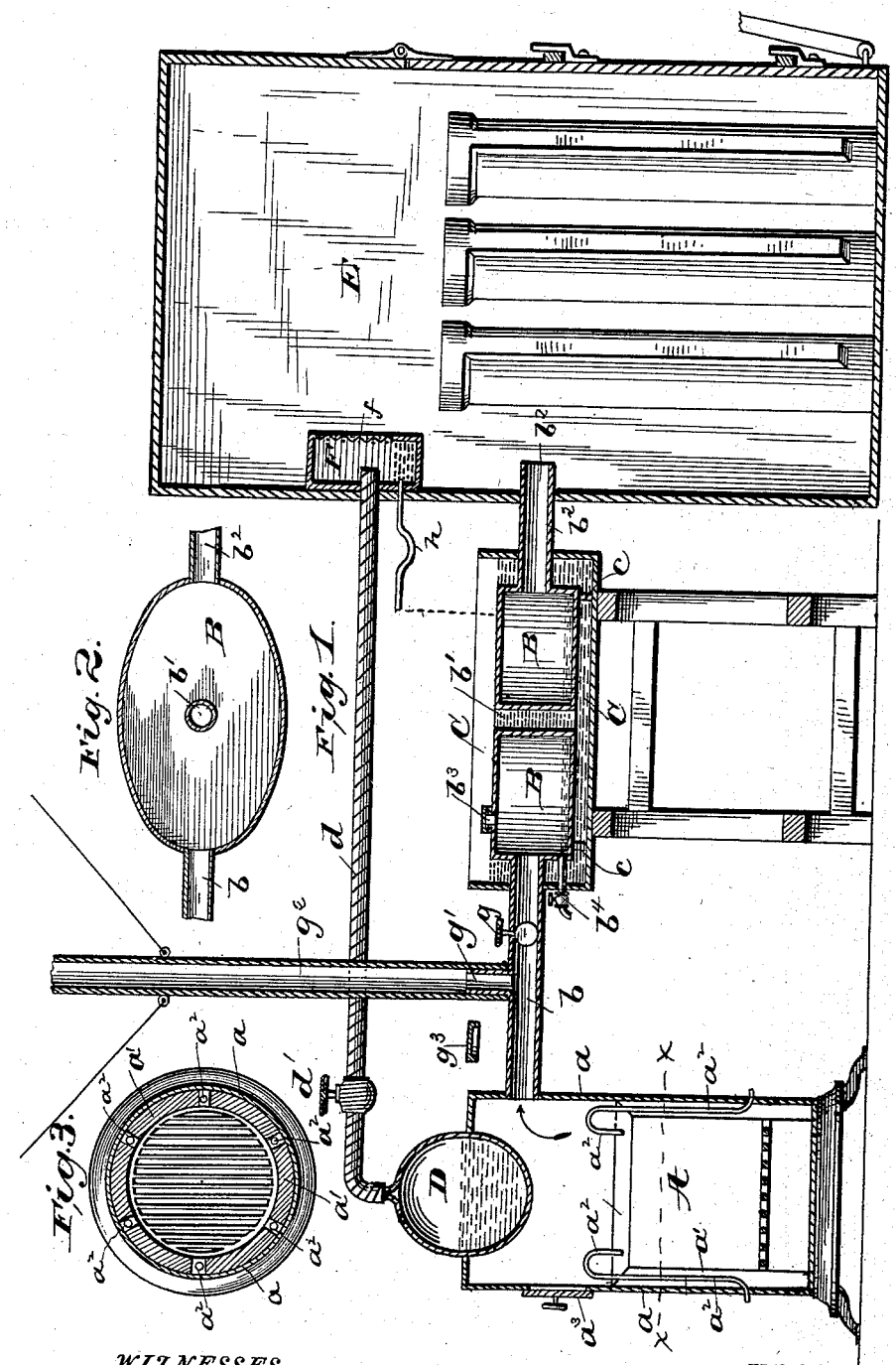
WITNESSES
INVENTOR
George Richardson

UNITED STATES PATENT OFFICE.

GEORGE RICHARDSON, OF WASHINGTON, DISTRICT OF COLUMBIA.

APPARATUS FOR HARDENING ARTIFICIAL STONE.

SPECIFICATION forming part of Letters Patent No. 413,263, dated October 22, 1889.

Application filed September 7, 1889. Serial No. 323,239. (No model.)

*To all whom it may concern:*

Be it known that I, GEORGE RICHARDSON, a citizen of the United States, residing at Washington, in the District of Columbia, have invented certain new and useful Improvements in Apparatus for Hardening Artificial Stone; and I do hereby declare the following to be a full, clear, and exact description of the invention, such as will enable others skilled in the art to which it appertains to make and use the same.

My invention relates to an apparatus for hardening pipes, paving-blocks, building-stone, and similar articles made from sand and cement, or of a concrete mixture of which cement is the principal or a part of the ingredients used, by subjecting the concrete article to the action of cooled carbonic gas and watery vapor.

My long practical experience in hardening cement by carbonic-acid gas and water or steam has fully demonstrated that in order to thoroughly harden cement concrete an air-tight furnace must be used, so constructed that air can be admitted to it without allowing the gas to escape into the room from which the fresh air is supplied; also, that both the steam and gas when generated must be cooled before they come in contact with the cement articles while in a green or raw state, in order to more thoroughly permeate the pores of the cement with carbonic-acid gas before the hot steam is admitted to the indurating-chamber, and that if hot steam is first allowed to come in contact with the articles while in a green state the lasting qualities of the cement are destroyed.

The object of my invention is to furnish a concrete or cement article of a greater degree of hardness than has heretofore been attained, without injuring the lasting and cohesive qualities of the cement, by restoring to the cement such chemical agencies of which it has been deprived during the process of burning the rock from which it was made, and this I accomplish by admitting the steam and gas to the indurating-chamber in a cool state for a sufficient length of time to allow the carbonic-acid gas to penetrate the pores of the cement and harden it as far as the gas and steam can penetrate, after which I find it necessary to introduce hot steam to allow the carbonic-acid gas to thoroughly penetrate the article in order to harden it uniformly throughout.

To this end my invention consists in the construction and arrangement of a gas-generating apparatus, a steam-generator, an indurating-chamber, and means for cooling the gas and steam before coming in contact with the material while said material is in a green state.

In order that my invention may be more clearly understood, I have illustrated it in the accompanying drawings, in which Figure 1 is a vertical central section of the entire apparatus. Fig. 2 is a horizontal section of the gas-cooler, and Fig. 3 is a horizontal section of the furnace in the line $x\,x$.

A indicates the carbonic-acid-gas-generating furnace; B, the gas-cooler; C, the tank containing the gas-cooling medium; D, the steam or vapor generating vessel; E, the indurating-chamber, and F the steam-vapor cooler.

The furnace A consists of a sheet-iron casing $a$, lined with fire-brick $a'$, between the rows of which are placed a series of small gas-pipes $a^2$, sufficient to admit the necessary supply of oxygen to the furnace. These pipes $a^2$ are of goose-neck form—that is, bent at the bottom so as to project through the sheet-iron casing of the furnace just above the grate, and at the upper ends turned inward and downward, the open end terminating just above the fuel in the fire-pot. In one side, near the top, the furnace is provided with the usual charging-door $a^3$, and also with a flue $b$, leading into one end of a gas-cooler B. In my former patent, No. 170,594, I have shown the gas-cooler as formed of a coiled pipe, the coil of which dips in a tank of water, so that the gas as it reaches the bottom of the coil is cooled and requires to be forced up and into the indurating-chamber by the hot gas behind it. In order to avoid this back-pressure, I prefer to pass the gas through the cooler in a direct line; and to this end the cooler consists of a flat elliptical box constructed, preferably, of galvanized iron, and having a vertical tubular opening connecting the top and bottom of the cooler. At the other end of the cooler is an exit-pipe $b^2$, delivering into the indurating-chamber E. The cooler is supported upon legs $c\ c$ in the tank C, which contains cold water or other cooling material, so as to allow the water to spread itself on all sides thereof.

In order to purify the gas in its passage through the cooling-box B, I place in said box a thin layer of water, an opening $b^3$ and gas-tight cap being provided in the top of said box for the purpose, and a nozzle $b^4$ near the bottom for the purpose of drawing off said water.

In the pipe $b$, leading from the furnace A to the gas-cooler B, is a valve $g$, and intermediate said valve and the furnace is a branch pipe $g'$, adapted to receive a removable flue or uptake $g^2$, a cap $g^3$ being provided to close the end of said branch pipe when the flue $g^2$ is removed.

The steam or vapor generator consists of a vessel D, containing water or other vaporizing liquid, located on the furnace, so as to be acted on by the direct heat of the furnace, and leading from the vapor-generator D is a pipe $d$, which delivers into a cooling-box F, located in the indurating-chamber. This cooling-box F is water-tight for a short distance above the bottom in order to retain a small quantity of the water of condensation, and to prevent the water from rising therein above a certain point an overflow-pipe $h$ is provided, which delivers into the tank C, and in the side of the cooling-box F is a fine wire-gauze or series of perforations for the purpose of retarding the passage of steam, to reduce the temperature thereof before coming in contact with the concrete material to be hardened.

I prefer to wrap the steam-pipe $d$ with a covering of asbestus or other heat-retaining material, and to provide the same with a valve $d'$.

The indurating-chamber is constructed of any desirable material perfectly gas-tight, and is furnished with the usual door for entering the same when it is desired to place in a fresh supply of blocks to be hardened.

The operation of my apparatus is as follows: The articles to be hardened having been placed in the indurating-chamber and said chamber closed practically gas-tight, the fire is started in the furnace, the valve $g$ is closed, and the smoke and gases allowed to pass through flue $g^2$ until the charcoal or other carbonaceous material is ignited, after which the valve $g$ is opened, the flue $g^2$ removed, and the branch pipe $g'$ closed by cap $g^3$, when the fire from the burning charcoal or other carbonaceous material heats the pipes $a^2$, thereby drawing in a fresh supply of oxygen, which, mingling with the gases in the furnace, produces free combustion and pure carbonic gas, which is conducted through the pipe $b$ into the gas-cooler B, thence through the pipe $b^2$ into the indurating-chamber in a cool state. At the same time the heat from the furnace converts the water or other liquid in the vessel D into steam or vapor, which passes through pipe $d$ to the cooling-box F, where its temperature is reduced, and thence into the indurating-chamber, where it mingles with the carbonic-acid gas and assists in hardening the cement. After the material in the indurating-chamber has been subjected to the action of the cool carbonic-acid gas for a sufficient length of time to allow the cool gas to penetrate and harden it as far in as possible the screen $f$ of the cooling-box F is removed and the hot steam allowed to come in direct contact with the material to be hardened, which not only hardens the interior, but also sets any coloring-matter which may have been previously applied.

Having described my invention, what I claim, and desire to secure by Letters Patent, is—

1. In an apparatus for hardening artificial stone, the combination, with the indurating-chamber, of gas and steam generators having each a pipe-delivery into said indurating-chamber, a cooling-box located in said gas-pipe intermediate the gas-generator and indurating-chamber, and a perforated cooling-box in the indurating-chamber, into which the steam is delivered, substantially as and for the purposes described.

2. In an apparatus for hardening artificial stone, the combination, with the gas-generating furnace and indurating-chamber, of a flue leading from the furnace to the chamber, a box or enlargement located in said flue, through which the gas is caused to pass, and a tank containing cold water, in which said box or enlargement is immersed, whereby the gas is cooled in its direct passage to the indurating-chamber, substantially as and for the purposes described.

3. In an apparatus for hardening artificial stone, the combination, with a steam-generator and indurating-chamber, of a perforated cooling-box, into which the steam is delivered from the generator, said cooling-box located in the indurating-chamber, substantially as and for the purposes described.

4. In an apparatus for hardening artificial stone, the combination, with the indurating-chamber, of a carbonic-acid-gas-generating furnace having a lining of fire-brick and a series of goose-neck air-inlet pipes arranged in said lining, whereby the air will be drawn in near the bottom of said furnace and discharged in downward jets above the fuel, and a gas-pipe leading from the furnace to the indurating-chamber, substantially as and for the purposes described.

In testimony whereof I affix my signature in presence of two witnesses.

GEORGE RICHARDSON.

Witnesses:
E. T. WALKER,
L. SIMMONS.